(12) United States Patent
Gunn et al.

(10) Patent No.: US 8,412,721 B2
(45) Date of Patent: Apr. 2, 2013

(54) EFFICIENT DATA EXTRACTION BY A REMOTE APPLICATION

(75) Inventors: Kerry R. Gunn, Pacific Pines (AU); Vernon Murdoch, Southport (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/193,828

(22) Filed: Jul. 29, 2011

(65) Prior Publication Data

US 2013/0031112 A1    Jan. 31, 2013

(51) Int. Cl.
*G06F 9/45* (2006.01)
*G06F 17/30* (2006.01)

(52) U.S. Cl. ........ 707/755; 716/119; 375/348; 375/376; 717/141

(58) Field of Classification Search .................. 707/755; 717/141
See application file for complete search history.

(56) References Cited

U.S. PATENT DOCUMENTS

| | | |
|---|---|---|
| 7,698,398 B1 | 4/2010 | Lai |
| 7,865,871 B2 | 1/2011 | Maron |
| 2003/0159112 A1 | 8/2003 | Fry |
| 2004/0133538 A1* | 7/2004 | Amiri et al. ........................ 707/1 |
| 2005/0192922 A1* | 9/2005 | Edlund et al. ...................... 707/1 |
| 2006/0004725 A1 | 1/2006 | Abraido-Fandino |
| 2009/0024987 A1* | 1/2009 | Forster et al. .................. 717/141 |
| 2009/0083279 A1* | 3/2009 | Hasek ............................. 707/10 |
| 2009/0300286 A1 | 12/2009 | Synge |

\* cited by examiner

*Primary Examiner* — Shyue Jiunn Hwa
(74) *Attorney, Agent, or Firm* — Jeffrey S. Labaw; Amy J. Pattillo (57) ABSTRACT

A query controller accesses a cache comprising information related to data that is newly added to a database, responsive to detecting a data extraction application is ready to query the database for at least one data extraction rule. The information is added to the cache for each new data event received by a data processing application, prior to the data processing application adding the data parsed from each new data event to the database. The query controller evaluates each data extraction rule against the information in the cache to determine whether the information is relevant to at least one data extraction rule. The query controller sends a separate query by the data extraction application to the database only for any particular data extraction rules to which the information is relevant, such that the query controller reduces the number of queries sent for each query period to only queries based on data extraction rules that need to be reevaluated based on the information updated about data that is newly added to the database.

3 Claims, 7 Drawing Sheets

```
<Rule>
    <Type>Discover</Type>
    <Content>Individual Identifiable Information</Content>
    <Role>Staff</Role>
    <Trigger>
        <SummaryField>NumberOfFiles</SummaryField>
        <Range>
            <LowThreshold>10</LowThreshold>
            <HighThreshold>20</HighThreshold>
        </Range>
    </Trigger>
</Rule>
```
DATA EXTRACTION RULE 302

[Type, Content, Role, SummaryField]
FORMATTED RULE 304

```
<Message id=1>
    <Type>...</Type>
    <Content>...</Content>
    <Role>...</Role>
        <Name>...</Name>
        <Location>...</Location>
        <Manager>...</Manager>
        <UserID>...</UserID>
    <SummaryField>
        <Identifier>...</Identifier>
        <Value>...</Value>
    </SummaryField>
</Message>
```
XML MESSAGE FORM 306

(TypeHandler, ContentHandler,
RoleHandler, NameHandler,
LocationHandler, ManagerHandler,
UserIDHandler,
SummaryFieldHandler)
DEFAULT HANDLERS 308

(E TypeHandler, E ContentHandler,
E RoleHandler, NameHandler,
LocationHandler, ManagerHandler,
UserIDHandler,
E SummaryFieldHandler)
UPDATED HANDLERS 310

```
<Message id=1>
    <Type>Discover</Type>
    <Content>Individual Identifiable Information</Content>
    <Role>Staff</Role>
        <Name>Bob</Name>
        <Location>Australia</Location>
        <Manager>John</Manager>
        <UserID>12345</UserID>
    <SummaryField>
        <Identifier>NumberOfFiles</Identifier>
        <Value>15</Value>
    </SummaryField>
</Message>
```
XML EVENT 312

EFFICIENT DATA EXTRACTION BY A REMOTE APPLICATION

BACKGROUND

1. Technical Field

The embodiment of the invention relates generally to a data processing system and in particular, to efficient data extraction by a remote application from a database.

2. Description of Related Art

Gathering large amounts of data in a data store and identifying patterns in the gathered data, such as through data extraction for data mining, has become more prevalent as the amount of data placed on networks increases. Data extractions by an application server, on a database providing a data store, requires queries to be sent from a data extraction application at the application server to the database, with the results sent from the database back to the data extraction application to be interpreted. Database calls from the application server to the database come at a performance cost to the data extraction application, due to the latency from the data query to the database and to the return of data from the database. In addition, database calls from the application server to the database come at a performance cost to any other users of the database, due to the latency introduced by the database handling numerous queries from the data extraction application.

BRIEF SUMMARY

In view of the foregoing, there is a need for a method, system, and program for reducing the number of queries sent from the data extraction application to the database providing a data store, while maintaining data extraction application performance and accuracy.

One embodiment provides a method for reducing the number of queries sent by an application to a database. The method accesses a cache comprising information related to data that is newly added to a database responsive to detecting a data extraction application is ready to query the database for at least one data extraction rule. The information is added to the cache for each new data event prior to a data processing application adding the data parsed from each new data event to the database. The method evaluates each data extraction rule against the information in the cache to determine whether the information is relevant to at least one data extraction rule. The method sends a separate query by the data extraction application to the database only for any particular data extraction rules to which the information is relevant.

Another embodiment of the invention comprises a system for reducing the number of queries sent by an application to a database. The system includes a query controller operative on at least one processor and a memory. The query controller is operative to access a cache comprising information related to data that is newly added to a database responsive to detecting a data extraction application is ready to query the database for at least one data extraction rule. The query controller is operative to evaluate each data extraction rule against the information in the cache to determine whether the information is relevant to at least one data extraction rule. The query controller is operative to send a separate query by the data extraction application to the database only for any particular data extraction rules to which the information is relevant.

Another embodiment of the invention comprises a computer program product for reducing the number of queries sent by an application to a database. The computer program product comprises one or more computer-readable, tangible storage devices. In addition, the computer program product comprises program instructions, stored on at least one of the one or more storage devices, to access a cache comprising information related to data that is newly added to a database responsive to detecting a data extraction application is ready to query the database for at least one data extraction rule. The computer program product comprises program instructions, stored on at least one of the one or more storage devices, to evaluate each data extraction rule against the information in the cache to determine whether the information is relevant to at least one data extraction rule. The computer program product comprises program instructions, stored on at least one of the one or more storage devices, to send a separate query by the data extraction application to the database only for any particular data extraction rules to which the information is relevant.

Another embodiment of the invention provides a method for managing information about data added to a database. A data processing application receives a new data event. The data processing application parses the new data event to identify at least one parsed element. The data processing application determines, for each parsed element, whether the parsed element is specified as an element of interest in at least one data extraction rule specified for at least one data extraction application that queries the database for data based on the at least one data extraction rule. For each parsed element specified as an element of interest, the data processing application calls a data extraction handler for the parsed element to add information about the parsed element to a cache and calls a default handler for the parsed element to add the data for the parsed element to the database. For each parsed element not specified as at least one element of interest in the at least one data extraction rule, the data processing application calls the default handler for the parsed element to add the data for the parsed element to the database. Access to the information in the cache is shared with the data extraction applications, such that the data extraction applications may determine, for each query period, if any of the data extraction rules need to be reevaluated based on the information in shared in the cache about new data stored in the database.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 3 illustrates several illustrative examples of a data extraction rule, a formatted rule, an XML message form, default handlers, updated handlers, and an XML event;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
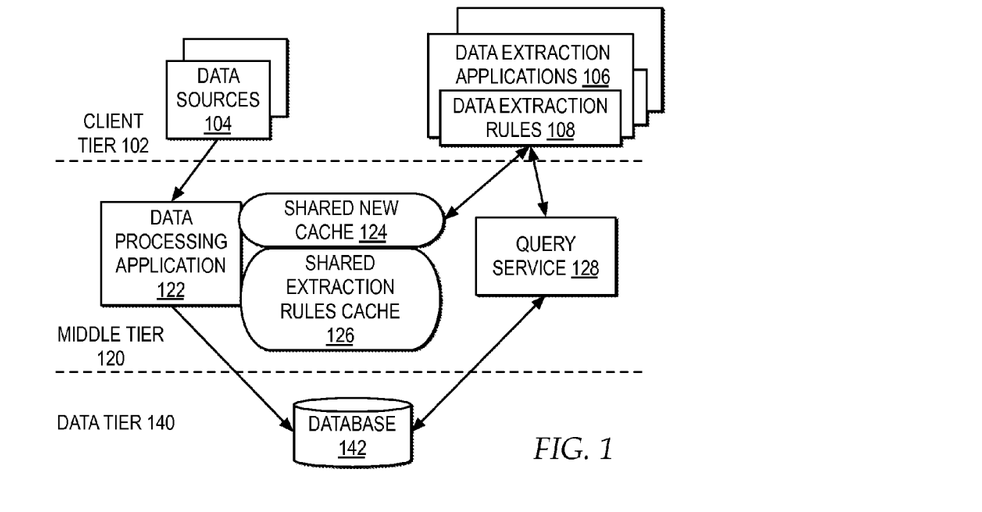
FIG. 1 illustrates a system architecture including at least one data extraction application for sending queries to a database in which the present invention may be implemented.

With reference now to the Figures, and in particular with reference now to FIG. 1, a block diagram illustrates a system architecture including at least one data extraction application for sending queries to a database in which the present invention may be implemented. In one example, a system architecture 100 includes one or more of a client tier 102, middle tier 120, and data tier 140. Each of the elements in each of client tier 102, middle tier 120, and data tier 140 may be distributed across one or more systems communicatively connected via a network.

In one example, one or more of client tier 102, middle tier 120, and data tier 140 are implemented within one or more application servers. In one example, an application server is a Java® application server, such as a Java Enterprise Edition 2 (J2EE) application server, with data loss prevention services, implementing software including one or more layers including an operating system, middleware and applications and running one or more Java Virtual Machines (JVMs) within the J2EE infrastructure.

In the example, multiple data extraction applications 106 implemented in client tier 102 each include one or more sets of data extraction rules 108. Each of data extraction applications 106 periodically generates queries for extracting data from a database 142 in data tier 140, based on data extraction rules 108 specified for the particular data extraction application. Data extraction applications 106 and data extraction rules 108 may each by specified for one or more different entities sharing access to database 142.

One or more of data extraction applications 106 operate as remote applications when accessing database 142. In one example, data extraction applications 106 operate as remote applications when accessing database 142 because each query is first sent to query service 128, which then queries database 142. In another example, data extraction applications 106 operate as remote applications when accessing database 142 because data extraction applications 106 are implemented on a server system separate from the server system that implements database 142. While in the example data extraction applications 106 and data extraction rules 108 are illustrated in client tier 102, any of data extraction applications 106 and data extraction rules 108 may also be implemented in middle tier 120. In addition, although not depicted, system architecture 100 may include a presentation tier that includes a browser or other interface through which a user may access data extraction applications 106.

In one example, client tier 102 includes data sources 104, which represent one or more elements providing data to a data processing application 122 in middle tier 120, for storage in a database 142, in data tier 140. Database 142 may represent a data store. Data within data sources 104 may be encoded in one or more types of markup languages or formats. Data processing application 122 may implement a converter for converting all data received from data sources 104 into the Extensible Markup Language (XML) format.

In one example, data processing application 122 handles the data received from data sources 104 as XML based events. Data processing application 122 parses each XML event to identify data elements and the parsed data elements are stored in database 142. In addition, to improve the efficiency of data extraction applications 106, data processing application 122 stores information about XML events in shared new cache 124. Shared new cache 124 is a cache shared between the one or more data extraction applications 106. In one example, shared new cache 124 is a multi JVM shared cache, shared by multiple JVMs handling data extraction applications 106.

In particular, in storing information about XML events in shared new cache 124, data processing application 122 determines which new XML events are of interest to one or more of data extraction applications 106, and only stores information in shared new cache 124 about new XML events of interest to one or more of data extraction applications 106. By only storing information in shared new cache 124 about new XML events of interest to one or more of data extraction applications 106, data processing application 122 limits the number of searchable entries in shared new cache 124 to only entries that provide information of interest to data extraction applications 106 and also limits the processing overhead required to add entries to shared new cache 124 to only entries that provide information of interest to data extraction applications 106.

For data processing application 122 to determine which new XML events are of interest to one or more of data extraction applications 106, data processing application 122 accesses shared extraction rules cache 126. Shared extraction rules cache 126 includes the extraction rules from one or more of data extraction rules 108, formatted for use by data processing application 122. Each formatted extraction rule identifies a set of one or more elements of interest to one or more of data extraction applications 106 based on the elements defined in each rule within data extraction rules 108. In one example, shared extraction rules cache 126 is a multi JVM shared cache, shared by multiple JVMs handling data extraction applications 106. As data extraction rules 108 are updated, data processing application 122 dynamically updates the formatted rules in shared extraction rules cache 126 to reflect the updates.

In particular, because data extraction rules 108 may be specified in one or more different formats for each one of data extraction applications 106, data processing application 122 converts data extraction rules 108 into a shared rule format, such as a list of element names in a data extraction rule, and stores the formatted data extraction rules in shared extraction rules cache 126. For example, data extraction rules 134 may be in formats including, but not limited to, database objects, XML, files, and web services.

Data extraction applications 132 periodically send queries, based on data extraction rules 134, to query service 128 for querying database 142. Based on the data returned from database 142 to each of data extraction applications 132 in response to queries, each of data extraction applications performs data mining and other types of data analysis processing of the returned data from database 142.

In the embodiment, data extraction applications 106 are configured to generate queries for calling database 142 based on data extraction rules 108. In the invention, to reduce the number of queries generated by data extraction applications 106 and to reduce the number of calls sent by data extraction applications 106 to query service 128 for database 142, for each query period, each of data extraction applications 106 first determines whether any of data extraction rules 108 need to be reevaluated, in view of the information about new data events accessible in shared new cache 124. Next, each of data extraction applications 106 only sends queries for any rules among data extraction rules 108 that need to be reevaluated based on the information available in shared new cache 124. By first evaluating which rules from among data extraction rules 108 need to be reevaluated, based on information stored about new data events in shared new cache 124 prior to the storage of data from the new data events in database 142, each of data extraction applications 106 first limits the number of queries that need to be generated by each of data extraction applications 106, which reduces the workload for each data extraction application for query generation. In addition, by only generating queries for rules that need to be reevaluated, rather than generating queries for all of data extraction rules 108 each query period, the number of queries sent to query service 128 by data extraction applications 106 is reduced, which reduces the shared workload on query service 128 from multiple remote applications. Further, by only sending queries for rules that need to be reevaluated, each of data extraction applications 106 will also receive less data from query service 128, which reduces the workload for each data extraction application for query response processing.

In the embodiment, the entries in shared new cache 124 may need to be flushed. Flushing of shared new cache 124 may be performed by one or more of data processing application 122, data extraction applications 106, and a flushing service within middle tier 120, and may be dependent upon the types of rules in data extraction rules 108 and the query periods implemented by each of data extraction applications 106. In particular, flushing policies and configurations may be specified to avoid flushing shared new cache 124 prior to access to the information by data extraction applications 106, but also to minimize the amount of cache required for shared new cache 124. For example, if data extraction rules 108 are specified for a particular time period, such as six (6) hours, then at the end of the 6 hour period, a flushing service may clear entries older than 6 hours. In another example, if data extraction applications 106 are working in unison, one or more data extraction applications may be set to trigger the flushing service to flush one or more entries or one or more data extraction applications may be set to mark entries as read so that the flushing service can specifically target certain entries.

In the example, query service 128 receives queries from data extraction applications 106, handles each query, and returns query results, from database 142. In one example, query service 128 may also implement a local cache to store the results of query results returned from database 142, such that for subsequent queries matching the previous query, the results of the previous query are efficiently accessible from the local cache, also reducing the number of calls by query service 128 to database 142. Query service 128 maintaining database entries in a local cache, however, may require that query service 128 also validate the entries within the local cache, which increases the workload on query service 128. Maintaining valid entries within a local cache may require reevaluating the validity of entries for each new data event received at database 142 or for each selected time period. In addition, query service 128 maintaining database entries in a local cache may require additional cache for the local cache and the performance of query service 128 may be decreased by cache misses when first searching the local cache for each query. In the embodiment, because data extraction applications 106 are configured to efficiently limit the number of queries for a query period to query service 128 to only queries focused on the selection of data extraction rules 108 that need to be reevaluated based on the information about new data events in shared new cache 124, if query service 128 is enabled to implement a local cache, query service 128 may include a configurable setting for data extraction applications 106 to set to turn off caching of results in a local cache or to limit caching of results in a local cache to only particular types of results.

In the example, database 142 may include additional fields in the database tables specifically for each data extraction application that may reduce the amount of data searched for each query. For example, database 142 may include flags set to indicate each row within the database table that does not match one of data extraction rules 108, such that during each query any flagged rows are skipped, reducing the overall query time for each query. Flagging particular rows, however, is that flagging rows adds workload to database 142 because as data extraction rules 108 are dynamically adjusted, each row of database 142 must be reevaluated to determine whether to flag the row. As the number of rules within data extraction rules 108 increases and as the frequency of adjustments to data extraction rules 108 increases, the workload to maintain flagged rows in database 142 increases. In addition, flagging particular rows in database 142 may reduce the overall query time for each query, but flagging particular rows does not reduce the number of queries sent to database 142. In the embodiment, because data extraction applications 106 are configured to efficiently limit the number of queries for a query period to query service 128 to only queries focused on the selection of data extraction rules 108 that need to be reevaluated based on the information about new data events in shared new cache 124, if database 142 is enabled to implement fields for marking rows that do not match one of data extraction rules 108, database 142 may include a configurable setting for data extraction applications 106 to set to turn off the use of row marking or to limit row to particular data extraction rules.

In the example, data extractions applications 106 may have access to new data events at runtime from data processing application or directly from data sources 104, prior to the data in the new data events being stored in database 142. By accessing data extraction applications 106 accessing data at runtime, prior to the data being stored in database 142, data extraction applications 106 may not need to query database 142 because the data to be queried is already accessed by data extraction applications. Data extraction applications 106 accessing data at runtime, however, may increase the workload on data extraction applications 106 because data extraction applications 106 may need to reevaluate each of data extraction rules 108 as each new data event is received. In addition, data extraction applications 106 accessing data at runtime may not reduce the number of queries by data extraction applications 106 because if the new data event needs to be checked against historical data in database 142, then an additional query of database 142 would be required at runtime. In the embodiment, because data extraction applications 106 are configured to efficiently limit the number of queries for a query period to query service 128 to only queries focused on the selection of data extraction rules 108 that need to be reevaluated based on the information about new data events in shared new cache 124, if data extraction applications 106 are enabled to access data at runtime, data extraction applications 106 may include a configurable option for turning off data accesses at runtime or for limiting data accesses at runtime to particular types of data events, particular data sources, or particular time periods, for example.

Figure 2:
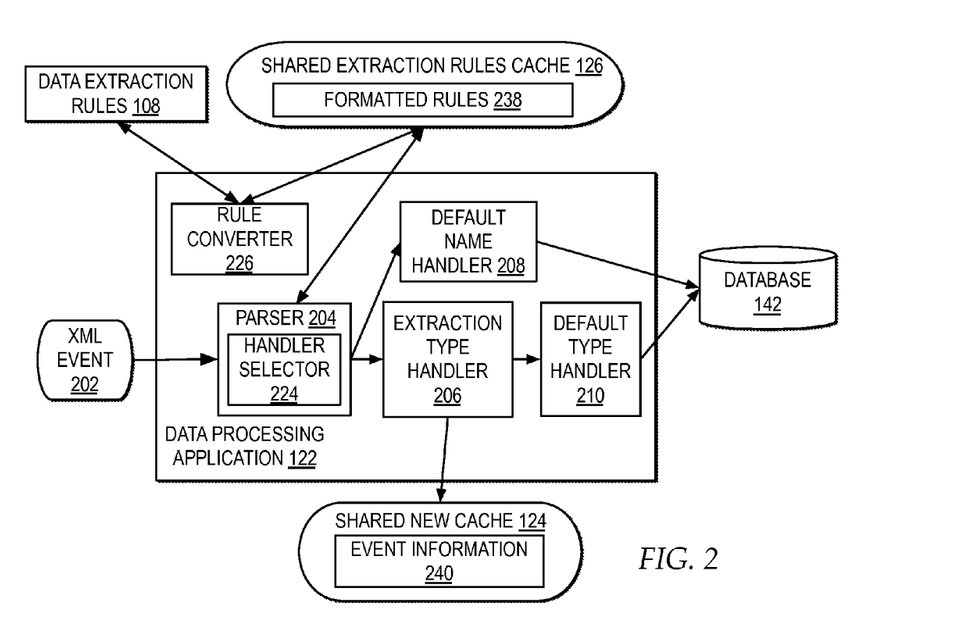
FIG. 2 illustrates a block diagram of a data processing application for caching information about new data events related to data extraction rules prior to storing the data in a database.

Referring now to FIG. 2, FIG. 2 depicts a block diagram of a data processing application for caching information about new data events related to data extraction rules prior to storing the data in a database.

In the example, data processing application 122 includes a rule converter 226 for reading data extraction rules 108 as the rules are updated, converting data extraction rules 108 into a format for use by a parser 204, and adding the converted extraction rules to shared extraction rules cache 126 as formatted rules 238. In the example, rule converter 226 is illustrated as a component or service of data processing application 122, however, rule converter 226 may also be implemented by a service separate from data processing application 122 or within client tier 102.

In one example, a data extraction rule accessed by rule converter 226 from data extraction rules 108 may comprise an XML rule such as data extraction rule 302 illustrated in FIG. 3. Data extraction rule 302, for example, is defined for data showing "Staff" with a range of "10" and "20" files containing "Individual Identifiable Information" on their workstation. In one example, rule converter 226 converts data extraction rule 302 by flatting the rule into a set of elements of interest in a list such as "[Type, Content, Role, SummaryField]" as illustrated in formatted rule 304 and adds the set to shared extraction rules cache 126. In particular, in the example, rule converter 226 converted the XML elements of <Type></Type>, <Content></Content>, <Role></Role>, and <SummaryField></SummaryField> from data extraction rule 302 into a formatted rule listing the elements of interest of "Type", "Content", "Rule", and "SummaryField" for use by parser 204. In other embodiments, rule converter 226 may convert data extraction rules 108 into other types of formats for use by parser 204.

As illustrated, data processing application 122 includes parser 204 for reading formatted rules 238 from shared extraction rules cache 126. In addition, parser 204 parses XML events, such as XML event 202, selects element handlers for each element name encountered when parsing XML event 202, and creates the selected element handlers for each element names encountered when parsing XML event 202. In the example, the incoming event is an XML event 202 representing a data event from one of data sources 104, however, other types of events may be implemented. Parser 204 may include one or more of a Simple Application programming Interface (API) for XML (SAX) parser, a Document Object Model (DOM) parser, or other type of parser.

In one example, parser 204 implements a handler selector 224 to parse incoming XML event 202, select a correct element handler for each element name encountered when parsing XML event 202 based on formatted rules 238, and create the selected element handlers for each element name encountered when parsing XML event 202. In one example, handler selector 224 implements a SAX DefaultHandler to parse incoming XML event 202. In addition, handler selector 224 is configured to implement multiple types of object oriented element handlers to handle each of the individual elements expected in incoming events, such as XML event 202. The object oriented element handlers are defined to include default element handlers that parse the XML for storage in database 142 and defined to include data extraction handlers that parse the XML and add information about the parsed XML to a shared cache 222 before calling a default element handler. The SAX DefaultHandler of handler selector 224 is configured to select and create the correct element handler for each element name encountered during parsing.

In particular, in selecting and creating the correct element handler for each element encountered when parsing XML document 202, handler selector 224 selects between the default element handler that parses the XML element for storage in database 142 and the data extraction element handler that parses the XML element and adds information about the parsed XML element to shared new cache 124 before calling a default element handler. Handler selector 224 dynamically selects between the default element handler and the data extraction element handler based on the rules currently specifying elements of interest in formatted rules 238. Handler selector 224 selects data extraction element handlers for elements parsed in the XML that match a set of selected elements of interest in formatted rules 238. Handler selector 224 selects default element handlers for elements parsed in the XML that do not match a set of selected elements of interest in formatted rules 238.

In one example, parser 204 parses incoming XML events of the form illustrated in XML message form 306. In the example, handler selector 224 is configured with default handlers 308 for each of the expected first level elements of TypeHandler, ContentHandler, RoleHandler, NameHandler, LocationHandler, ManagerHandler, UserIDHandler, and SummaryFieldHandler. In the example, handler selector 224 reads formatted rules 304 and swaps a selection of default handlers 308 that match the elements in formatted rule 304 with data extraction handlers, as illustrated by the handlers "E TypeHandler", "E ContentHandler", "E RoleHandler", and "E SummaryFieldHandler" in updated handlers 310.

With the default handlers and data extraction handlers dynamically adjusted according to formatted rules 238, when XML event 202 arrives including XML elements illustrated in arriving XML event 312, handler selector 224 encounters the "Type" element in XML event 312, identifies that based on formatted rule 304 "Type" is an element of interest and the extraction type handler is set in updated handlers 310, and selects and calls an extraction type handler 206. Data extraction type handler 206 updates shared new cache 124 with information about the parsed type element and a default type handler 210 is called to store the parsed data in database 142. In addition, in the example, handler selector 224 encounters the "Name" element in XML event 312, identifies that based on formatted rule 304 "Name" is not an element of interest and the default name handler is set in updated handlers 310, and selects and calls a default name handler 208 to store the parsed data in database 142.

Data extraction handlers called by handler selector 224 store information about data events in shared new cache 124 in a format that facilitates efficient searching of the information by data extraction applications 106. In one example, data extraction handlers store event information 240 about data events in shared new cache 124 in a tree structure. By storing event information 240 about data events in shared new cache 124 in a tree structure, the depth of the tree is determined by the number of elements created for the rule in formatted rules 238 and the data extraction applications 106 can efficiently evaluate data extraction rules 108 against a tree structure.

Figure 4:
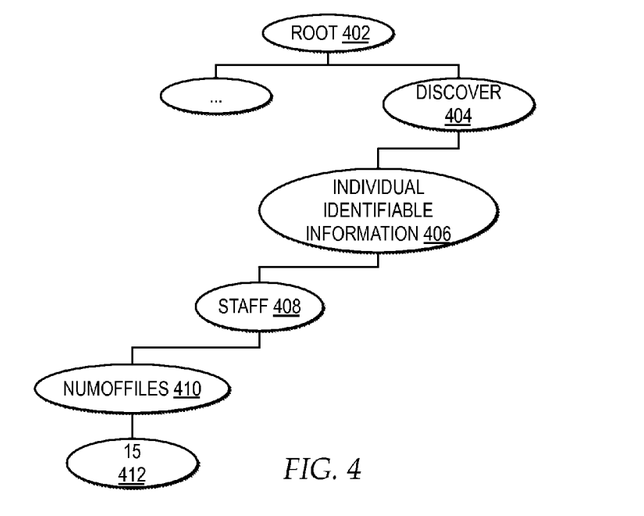
FIG. 4 illustrates a block diagram of a tree structure for storing information about new data events in shared new cache for use by data extraction applications.

Referring now to FIG. 4, FIG. 4 illustrates a block diagram of a tree structure for storing information about new data events in shared new cache for use by data extraction applications. In the example, a tree 400 illustrates the information stored for arriving XML event 312 as parsed in view of formatted rule 304. In the example, tree 400 includes a root 402, a "discover" node 404 parsed for the "Type" element in formatted rule 304, a "Individual Identifiable Information" node 406 for the "Content" element in formatted rule 304, a "Staff" node 408 for the "Role" element in formatted rule 304, and a "NumofFiles" node 410 and "15" node 412 for the "SummaryField" element in formatted rule 304. One of ordinary skill in the art will appreciate that additional or alternate branches may be included in tree 400.

Figure 5:
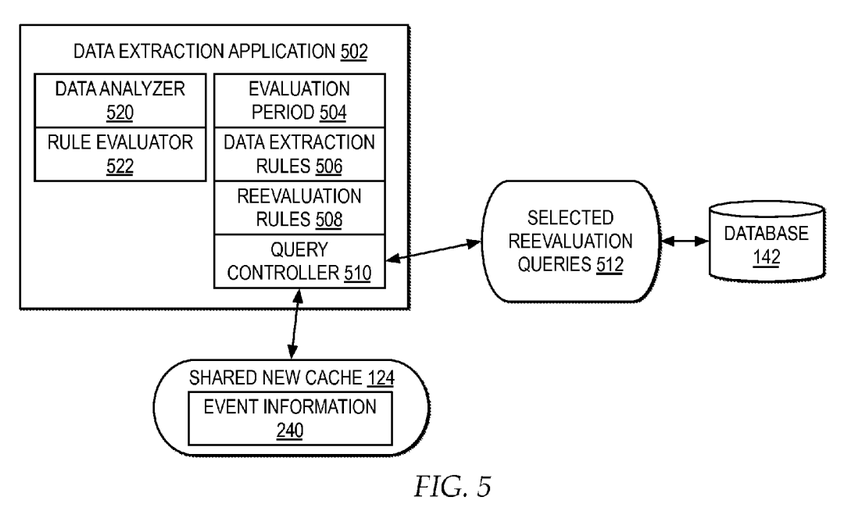
FIG. 5 illustrates a block diagram illustrates one example of a data extraction application evaluating data extraction rules against the event information in shared new cache to determine which rules to reevaluate by running queries at a remote database.

With reference now to FIG. 5, a block diagram illustrates one example of a data extraction application evaluating data extraction rules against the event information in shared new cache to determine which rules to reevaluate by running queries at a remote database.

In the example, data extraction application 502, such as a data extraction application from among data extraction applications 106, is configured with an evaluation period 504. Evaluation period 504 specifies the times or rules for calculating the times at which data extraction application 502 will start reevaluating data extraction rules 506.

Data extraction application 502 also includes data extraction rules 506, such as a set of data extraction rules from among data extraction rules 108. Data extraction rules 506 define the current rules for extracting data for use by data analyzer 520 to detect patterns in extracted data, such as through data mining, or performing other types of analysis of extracted data. In addition, data extraction application 502 may include a rule evaluator 522 for periodically analyzing the rules currently set in data extraction rules 506 and dynamically adjusting rules set in data extraction rules 506. In addition, one or more users may adjust data extraction rules 506 through a client interface.

Data extraction application 502 accesses a query controller 510 for controlling the selection of queries to send to database 142 and for controlling the sending of queries to database 142. A setting in evaluation period 504, a client interface input, or other types of inputs may trigger query controller to start a new query period. While in the example query controller 510 is illustrated as a component of data extraction application 502, query controller 510 may function as a service, module, or other application accessible to data extraction application 502 from client tier 102 or middle tier 120. In addition, in another embodiment, multiple data extraction applications may share query controller 510 or instances of query controller 510.

When a new query period is triggered, before query controller 510 runs any queries on database 142 based on data extraction rules 506, data extraction application 502 evaluates each rule within data extraction rules 506 against event information 240 in shared new cache 124 to determine which rules from among data extraction rules 506 need to be reevaluated. In particular, data extraction rules 506 are run against a tree structure in event information 240 and query controller 510 marks any rules that need to be reevaluated within reevaluation rules 508. Next, data extraction application 502 only runs queries on database 152 for any data extraction rules marked in reevaluation rules 508, as illustrated by selected reevaluation queries 512. Once query controller 510 runs the queries, query controller 510 returns to a sleep mode for the period of time specified in evaluation period 504.

For example, if data extraction rules 506 includes rules A, B, and C and query controller 510 only sets rule A in reevaluation rules 508 based on event information that indicates a new data event matching rule A, then query controller 510 only sends a query in selected reevaluation queries 512 for rule A. If query controller 510 did not have access to event information 240, query controller 510 would need to send three queries, for each of rule A, rule B, and rule C. In the embodiment, query controller 510 can limit queries to one query for rule A only and still operate with the same capability and accuracy as if three queries had been sent because only a query based on rule A will return updated data.

Figure 6:
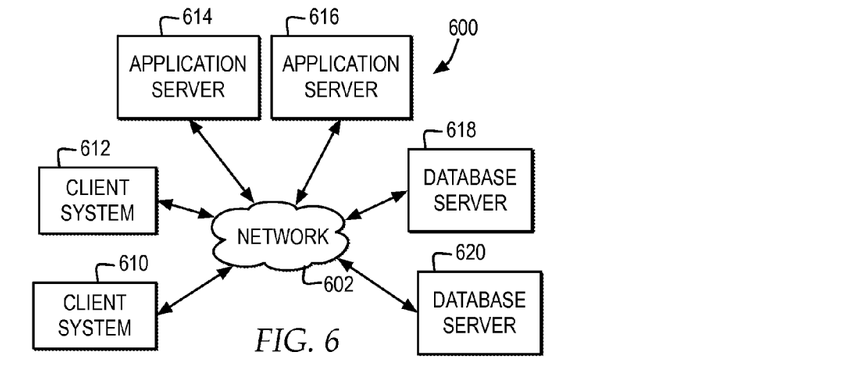
FIG. 6 illustrates a block diagram illustrates one example of a network environment in which the invention may be implemented.

Referring now to FIG. 6, a block diagram illustrates one example of a network environment in which the invention may be implemented. In the example, a network environment 600 includes network 602 for communicatively connecting multiple systems. In one example, network 602 communicatively connects client system 610, client system 612, application server 614, application server 616, database server 618, and database server 620. Network environment 600 may represent multiple types and layers of server systems, data systems, client systems configured in a distributed computing environment, a cluster computing environment, a grid environment, a cloud, or other network environment including multiple computing nodes. Network 602 may include, but is not limited to, packet-switching networks, such as the Internet or an intranet, and telephony networks. In addition, network 602 may include routers, switches, gateways, and other hardware to enable a communication channel between one or more systems. One of ordinary skill in the art will appreciate that network environment 600 may include additional or alternate systems.

In one embodiment one or more systems within network environment 600 may implement system architecture 100. In one example, database 142 may represent one or more physical databases distributed across one or more of database server 618 and database server 620. In another example, the components illustrated in each of client tier 102, middle tier 120, and database tier 140 may be implemented within one or more application servers implemented across one or more of application server 614 and application server 616. In another example, one or more components illustrated in client tier 102 may be implemented across one or more of client system 610 and client system 612.

In another embodiment, system architecture 100 represents an environment in which data extraction applications 106 are implemented in one or more remote systems from database 142 and in which multiple instances of data extraction applications query database 142. For example, data extraction applications 106 may be implemented in application server 614 and database 142 may be implemented in database server 618, where data extraction applications 106 are remote applications when querying database 142.

Figure 7:
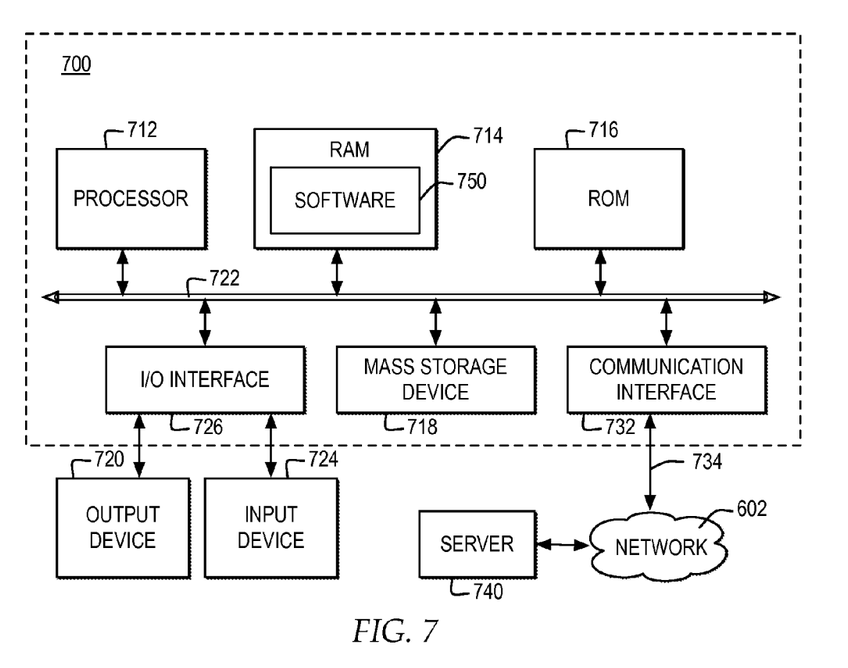
FIG. 7 illustrates one example of a computer system in which the present invention may be implemented.

FIG. 7 illustrates one example of a computer system in which the present invention may be implemented. The present invention may be performed in a variety of systems and combinations of systems, made up of functional components, such as the functional components described with reference to computer system 700 and may be communicatively connected to a network, such as network 602. In one example, each of client system 610, client system 612, application server 614, application server 616, database server 618, and database server 620 may implement one or more of the functional components described with reference to computer system 700.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power. Where multiple processors share bus 522, additional controllers (not depicted) for managing bus access and locks may be implemented.

Processor 712 may be at least one general-purpose processor such as IBM® PowerPC® processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems, including, but not limited to, client system 610, client system 612, application server 614, application server 616, database server 618, and database server 620.

In one embodiment, the operations performed by processor 712 may control the operations of flowchart of FIGS. 8, 9, 10, and 11 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 718, a random access memory (RAM), such as RAM 714, a read-only memory (ROM) 716, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 700, partly on the user's computer, as a stand-alone software package, partly on the user's computer and partly on a remote computer or entirely on the remote computer or server. In the latter scenario, the remote computer may be connected to the user's computer through any type of network, such as network 602, through a communication interface, such as network interface 732, over a network link that may be connected, for example, to network 602.

In the example, network interface 732 includes an adapter 734 for connecting computer system 700 to network 602 through a link. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 700, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 700, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 732, the network link to network 602, and network 602 may use electrical, electromagnetic, or optical signals that carry digital data streams. The signals through the various networks and the signals on network 602, the network link to network 602, and network interface 732 which carry the digital data to and from computer system 700, may be forms of carrier waves transporting the information.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

Figure 8:
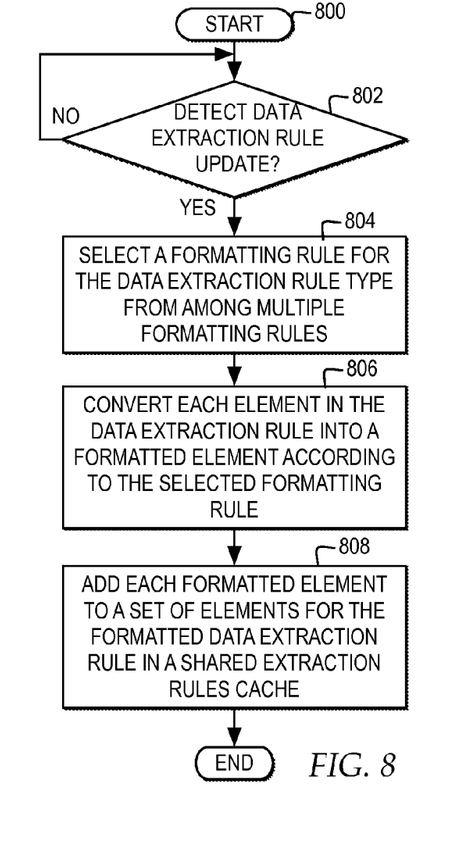
FIG. 8 illustrates a high level logic flowchart for formatting data extraction rules for a shared extraction rules cache for use by a data processing application.

FIG. 8 illustrates a high level logic flowchart for formatting data extraction rules for a shared extraction rules cache for use by a data processing application. As illustrated, the process starts at block 800 and thereafter proceeds to block 802. Block 802 depicts a determination whether a rule converter detects a data extraction rule update for one of the data extraction applications. Block 804 illustrates selecting a formatting rule for the type of data extraction rule from among multiple formatting rules. Next, block 806 depicts converting each element in the data extraction rule into a formatted element according to the selected formatting rule. Thereafter, block 808 illustrates adding each formatted element to a set of elements for the formatted data extraction rule in a shared extraction rules cache, and the process ends.

Figure 9:
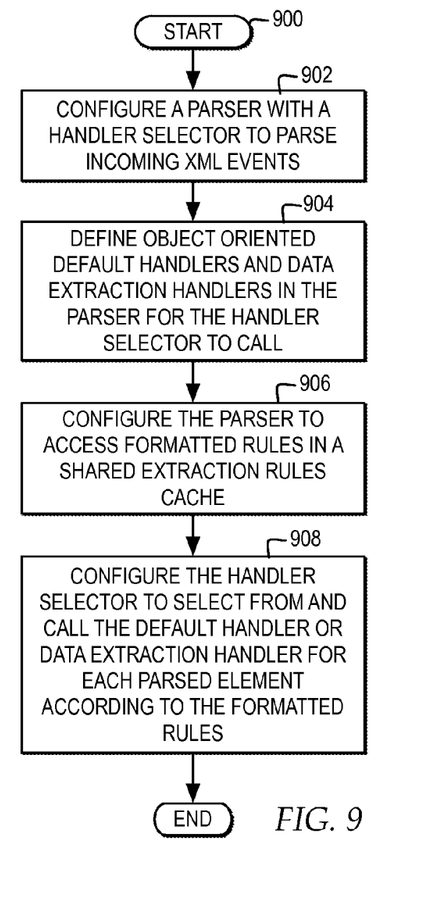
FIG. 9 illustrates a high level logic flowchart for configuring a parser of a data processing application to efficiently cache information about new data events of interest to one or more data extraction applications.

FIG. 9 illustrates a high level logic flowchart for configuring a parser of a data processing application to efficiently cache information about new data events of interest to one or more data extraction applications. As illustrated, the process starts at block 900 and thereafter proceeds to block 902. Block 902 illustrates configuring a parser with a handler selector to parse incoming XML events. Next, block 904 depicts defining object oriented default handlers and data extraction handlers in the parser for the handler selector to call. Thereafter, block 906 illustrates configuring the parser to access formatted rules in a shared extraction rules cache. Next, block 908 depicts configuring the handler selector to select from and call the default handler or data extraction handler for each parsed element according to the formatted rules, and the process ends.

Figure 10:
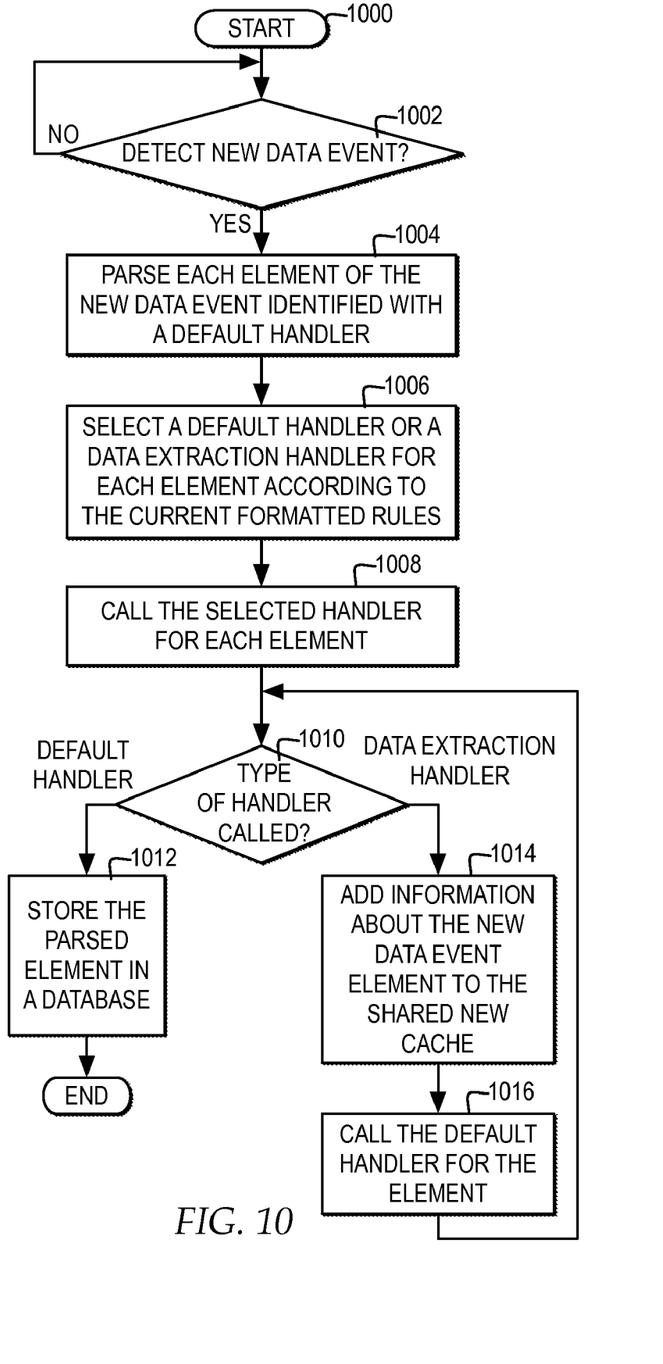
FIG. 10 illustrates a high level logic flowchart for handling an incoming data event according to formatted rules specifying elements of interest to one or more data extraction applications.

FIG. 10 illustrates a high level logic flowchart for handling an incoming data event according to formatted rules specifying elements of interest to one or more data extraction applications. As illustrated, the process starts at block 1000 and thereafter proceeds to block 1002. Block 1002 illustrates a determination whether a new data event is detected by a data processing application for parsing data events and storing parsed data in a database. If a new data event is detected, then the process passes to block 1004. Block 1004 illustrates parsing each element of the new data event, where the parsed elements are identified as elements matching a defined default handler. Next, block 1006 depicts selecting a default handler or a data extraction handler for each element according to the current formatted rules, where the formatted rules specify elements of interest to one or more data extraction applications. Thereafter, block 1008 illustrates calling the selected handler for each element, and the process passes to block 1010.

Block 1010 illustrates a determination as to what type of handler is called. If a default handler is called for an element, the process passes to block 1012. Block 1012 illustrates the default handler controlling storage of the parsed element in a database, and the process ends.

Returning to block 1010, at block 1010, if a data extraction handler is called for an element, the process passes to block 1014. Block 1014 illustrates the data extraction handler controlling the addition of information about the new data event element to the shared new cache. Next, block 1016 depicts the data extraction handler calling the default handler for the element, and the process returns to block 1010.

Figure 11:
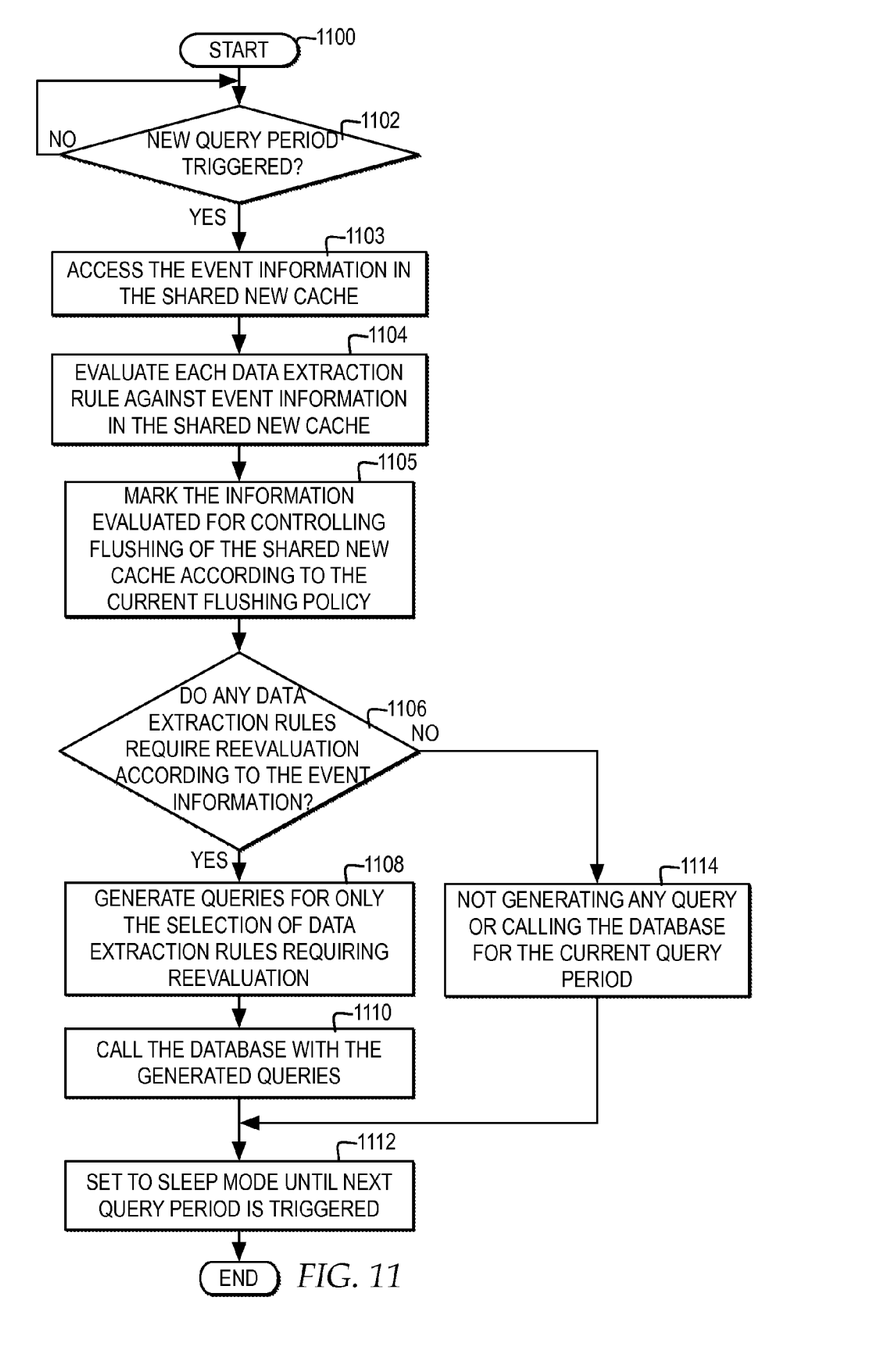
FIG. 11 illustrates a high level logic flowchart for determining which data extraction rules to reevaluate for a query period.

FIG. 11 illustrates a high level logic flowchart for determining which data extraction rules to reevaluate for a query period. As illustrated, the process starts at block 1100 and thereafter proceeds to block 1102. Block 1102 illustrates a determination whether a new query period is triggered for a data extraction application. In one example, when a query controller of a data extraction application detects a trigger for a new query period, the query controller detects that the data extraction application is ready to query the database for at least on data extraction rule. If a new query period is triggered, then the process passes to block 1103. Block 1103 depicts accessing the event information in the shared new cache, wherein the event information is added to the cache for each data event prior to adding the data parsed from each new data event to the database and wherein the information may only comprise entries for a selection of elements specified as elements of interest from by at least one data extraction rule from among the multiple elements parsed from received data events defining new data to add to the database. Next, block 1104 illustrates evaluating each data extraction rule for the data extraction application against the event information in the shared new cache. By evaluating each data extraction rule against the event information, the data extraction application determines which data extraction rules need to be reevaluated because the event information indicates that new data has been added to the database within the data extraction rule parameters. In one example, evaluating each data extraction rule for the data extraction application against the event information in the shared new cache includes evaluating each data extraction rule against the event information in the shared new cache stored in a tree structure to identify whether any branch of the tree structure includes nodes relevant to the data extraction rule. Next, block 1105 illustrates marking the information evaluated for controlling flushing of the shared new cache according to the current flushing policy.

Block 1106 illustrates a determination whether any data extraction rules require reevaluation according to the event information. At block 1106, if no data extraction rules require reevaluation for the query period, then the process passes to block 1114. Block 1114 illustrates not generating any query or calling the database for the current query period, and the process passes to block 1112. Block 1112 illustrates setting the query controller to a sleep mode until the next query period is triggered, and the process ends. Returning to block 1106, if at block 1106 at least one data extraction rule requires reevaluation for the query period, the process passes to block 1108. Block 1108 illustrates generating queries for only the selection of data extraction rules requiring reevaluation. Next, block 1110 illustrates calling the database with the generated queries, and the process passes to block 1112.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing information about data added to a database, comprising:

receiving, using at least one processor, by a data processing application, a new data event specifying data received from a data source to be stored in a database by the data processing application;

parsing, using the at least one processor, by the data processing application, the new data event to identify at least one parsed element;

determining, using the at least one processor, by the data processing application, for each at least one parsed element, whether the at least one parsed element is specified as at least one element of interest in at least one data extraction rule specified for at least one data extraction application that queries the database for data based on the at least one data extraction rule;

for each parsed element specified as at least one element of interest, calling, using the at least one processor, by the data processing application, a data extraction handler for the parsed element to add information about the parsed element to a cache and calling a default handler for the parsed element to add the data for the parsed element to the database;

for each parsed element not specified as at least one element of interest in the at least one data extraction rule, calling, using the at least one processor, by the data processing application, the default handler for the parsed element to add the data for the parsed element to the database;

sharing, using the at least one processor, access to the information in the cache with the at least one data extraction application;

accessing, using the at least one processor, by the at least one data extraction application, the information in the cache;

evaluating, using the at least one processor, by the at least one data extraction application, whether each at least one data extraction rule needs to be reevaluated based on the information;

querying the database, using the at least one processor, by the at least one data extraction application, based only on at least one particular data extraction rule from among the at least one data extraction rule identified by the at least one data extraction application as needing to be reevaluated.

2. The method according to claim 1, further comprising:

accessing, using the at least one processor, a first data extraction rule in a first format;

identifying, using the at least one processor, each particular element within the first data extraction rule specified as associated with a default handler according to a first formatting rule for the first format;

storing, using the at least one processor, each particular element in a first list in a standard format in the cache;

accessing, using the at least one processor, a second data extraction rule in a second format;

identifying, using the at least one processor, each particular element within the second data extraction rule specified as associated with a default handler according to a second formatting rule for the second format; and storing, using the at least one processor, each particular element in a second list in the standard format in the cache.

3. The method according to claim 1, further comprising:

defining, using the at least one processor, a plurality of object oriented default handlers and a plurality of object oriented data extraction handlers for a parser of the data processing application to select and to call.

* * * * *